United States Patent [19]
Kogert

[11] 3,870,852
[45] Mar. 11, 1975

[54] PROCESS AND APPARATUS FOR CUTTING RUBBERISED STRANDED WIRE

[75] Inventor: Herbert Kogert, Wien, Austria

[73] Assignee: Semperit Osterreichisch-Amerikanische Gummiwerke Aktiengesellschaft, Vienna, Austria

[22] Filed: Dec. 1, 1969

[21] Appl. No.: 881,235

[52] U.S. Cl. ........................................ 219/121 LM
[51] Int. Cl. ............................................ B23k 27/00
[58] Field of Search ............. 219/121, 68; 114/221; 116/54.5; 102/21.2

[56] References Cited
UNITED STATES PATENTS

| | | | |
|---|---|---|---|
| 2,679,570 | 5/1954 | Cisne | 219/68 X |
| 3,204,076 | 8/1965 | Browning | 219/121 P |
| 3,303,319 | 2/1967 | Steigerwald | 219/121 |
| 3,378,446 | 4/1968 | Whittlesey | 176/1 |
| 3,400,456 | 9/1968 | Hanfmann | 219/121 L |

OTHER PUBLICATIONS

IBM Technical Disclosure Bulletin, Vol. 8, No. 3, August 1965, pp. 434.
Welding Institute Research Bulletin, "The Use of the CO Laser for Cutting and Welding," vol. 9, Sept. 1968.
Welding Journal, British, "Gas Jet Laser Cutting," August 1967, pp. 443–445.

*Primary Examiner*—J. V. Truhe
*Assistant Examiner*—Clifford C. Shaw
*Attorney, Agent, or Firm*—Werner W. Kleeman

[57] ABSTRACT

A process and apparatus is disclosed for cutting rubberised wire in which a carbon dioxide gas laser is provided to project a beam which is used to cut said rubberised wire.

Cooling means, a jet of a shield gas and/or a suction device may be provided.

4 Claims, 3 Drawing Figures

PATENTED MAR 1 1 1975

3,870,852

INVENTOR
HERBERT KOGLERT

BY Jacobi, Davidson & Kleeman

ATTORNEYS

PROCESS AND APPARATUS FOR CUTTING RUBBERISED STRANDED WIRE

BACKGROUND OF THE INVENTION

The invention relates to a process and apparatus for cutting rubberised stranded wire, such as reinforcing inserts of stranded steel wire for use in tyre manufacture.

Hitherto, such reinforcing inserts have been cut from a length of rubberised wire using mechanical cutting devices such as hammer shears or rotary blade cutters. Such cutting devices have the disadvantage, in particular where steel cord inserts are concerned, that during the severe action the strands ran out and therefore their ends constitute a danger point in the finished tyre. A source of internal damage to the tyre structure is often formed due to the fact that the wire strand ends cut into the rubber structure and form cracks which are then enlarged by the flexing action of the tyre during use. Furthermore, with mechanical cutting, the surface bonding layer of the steel cords, which is to improve the adherence to rubber, is broken at the cut, which increases the danger of subsequent damage to a finished tyre during use.

The viability of a laser, and in particular a gas laser in the field of tyre manufacture has hitherto been regarded as unprofitable, being considered to be both uneconomic and unsuitable, the first in view of the expense involved, and the second in view of the general opinion that such widely differing materials as rubber and metal could not be cut simultaneously by a single laser beam because the rubber would burn away before the metal had been properly cut.

SUMMARY OF THE INVENTION

The present invention consists however in a process for cutting rubberised wire in which the cutting operation is carried out by a laser beam which is moved along the desired line of cut. Preferably a gas laser is employed.

The present invention consists further in an apparatus for cutting rubberised wire in which a laser is provided to project a beam which is used to cut said rubberised wire.

It has been found that a cutting of such dissimilar materials as rubber and metal is possible, and may be effected very efficiently by a 250 Watt $CO_2$ gas laser. Microscopic examination of the cut surfaces of the individual wires cut by the laser beam shows that there are no sharp edges, and the majority are in fact rounded off by the melting process.

The action of the laser beam does not merely cut the stranded steel cords, but these are melted at the cutting zone, so that instead of the sharp edges formed in conventional cutting operations the ends are actually rounded off, thus substantially eliminating the danger of any cutting action within a finished tyre, during use.

Furthermore, a modification of the surface takes place in the zone of the cut, and this provides for improved bonding properties, particularly if the cutting zone has been cooled by a cooling device, since this prevents destruction of the rubber coating in the area adjacent the cut.

In order to remove any danger of the rubber igniting, at least one jet of a shield gas is directed over the cutting zone. The shield gas may be nitrogen, carbon dioxide, or a rare gas, for example. In order to keep the zone of the cut and its environment free of decomposition products, it is convenient to provide an appropriate suction device in the zone of the cut as will be described with reference to the drawings.

Several layers can be cut simultaneously if they are held firmly together. Otherwise, any combustion gases tend to "glow" between the layers and lead to blackening at the edges. The cooling equipment employed in the embodiment described serves to exert a pressure on individual layers, if more than one layer is inserted into the cutting device, so that they remain in contact with one another, and so overcome this problem.

DESCRIPTION OF THE PREFERRED EMBODIMENTS

The invention will now be described with reference to the drawings, in which.

Figure 1:
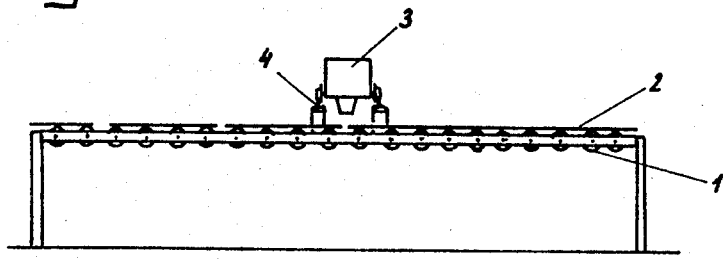
FIG. 1 is a schematic illustration of one exemplary embodiment of the invention.

A roller track 1 conveys a reinforced rubberised steel wire fabric 2 which is to be cut to pass below a laser device 3 mounted on transverse rails 4 to enable the laser source 3 to be moved along the required cutting line by means not shown.

Figure 2:
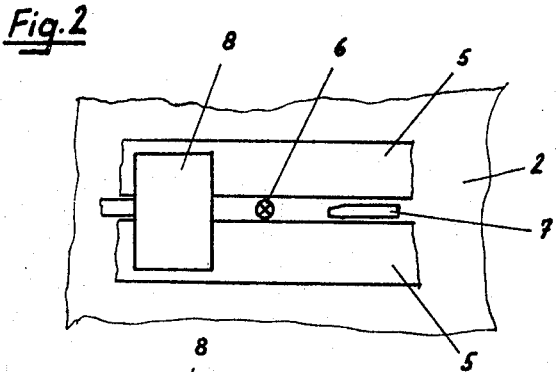
FIG. 2 is a sectional plan view of the cutting area in the embodiment shown in FIG. 1.
Figure 3:
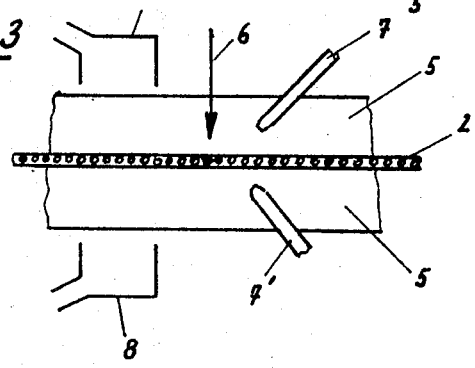
FIG. 3 is a cross-section of the cutting area in this exemplary embodiment.

FIGS. 2 and 3 show details of the arrangement in the cutting zone, where four cooled bars 5 are provided, each extending parallel to the cutting line, two of the cooled bars 5 being located above the reinforced web 2 and two being located below, one on each side of the cutting line in each case. Thus, the reinforced web can be clamped between the cooled bars prior to the cutting operation. The laser source 3 is then driven along the rails 4 so that its beam 6, whose cross-section is indicated in FIG. 2, is directed between the upper pair of cooling bars 5 onto the reinforced web 2. At the point at which the laser beam hits the reinforced web, a shield gas flow is provided via an upper jet 7 and a lower jet 7', and this gas flow is drawn off by suction devices 8 located one above and one below the web 2.

In some applications it may be more convenient to employ a stationary laser device, the laser beam 6 being moved along the line of cut by an optical deflecting system.

What is claimed is:

1. A process for simultaneously cutting two dissimilar materials such as rubberised metal wire for use as reinforcing inserts for the manufacture of tires, comprising the steps of:

placing rubberised wire composed of metallic wire elements enclosed by a rubber coating in a position for performing a cutting operation, the metallic wire elements and the rubber coating having respectively different melting points;

directing a laser beam along the desired line of cut of the rubberised wire;

enclosing in a nonreactive shielding gas atmosphere said laser beam and said rubberised wire at the point of incidence of said laser beam in order to remove any danger of the rubber igniting;

clamping said rubberised wire with cooled bars, the combination of the steps of enclosing in a nonreactive shielding gas atmosphere and clamping said rubberised wire with cooled bars acting to effectively prevent destruction of the rubber coating in the area adjacent the cut;

removing by suction any decomposition products which may appear at the region of the line of cut of the rubberised wire; and simultaneously cutting by means of the directed laser beam both the rubber coating and the metallic wire elements.

2. The process as defined in claim 1, including the step of utilizing a carbon dioxide gas laser to produce the laser beam.

3. The process as defined in claim 1, wherein the cooling step is undertaken during clamping of the rubberised wire at both sides of the line of cut.

4. The process as defined in claim 1, wherein suction is applied near the point of incidence of the laser beam upon the rubberised wire.

* * * * *